July 2, 1929. J. UNTERHOLZNER Re. 17,349

CONDENSER TELEPHONE

Original Filed Aug. 13, 1912

INVENTOR
Josef Unterholzner
BY
Ward + Crosby
ATTORNEYS

Reissued July 2, 1929. Re. 17,349

UNITED STATES PATENT OFFICE.

JOSEF UNTERHOLZNER, OF MUNICH, GERMANY, ASSIGNOR, BY MESNE ASSIGNMENTS, TO WILLIAM FOX, OF WOODSBURGH, NEW YORK.

CONDENSER TELEPHONE.

Original No. 1,082,248, dated December 23, 1913, Serial No. 714,756, filed August 13, 1912, and in Germany August 28, 1911. Application for reissue filed March 13, 1929. Serial No. 346,774.

The invention relates to improvements in condenser-telephones and the object of the invention is a condenser-telephone permitting a specially clear and loud transmission of sounds. There are known mechanisms producing waves of sound by means of a diaphragm and an electrified condenser plate. In those mechanisms the vibrations of the diaphragm are deadened by the thin stratum of air between the diaphragm and the condenser-plate. In replacing the impermeable condenser-plate by a perforated plate or grid, the invention in question avoids the said disadvantage and allows at the same time to influence the diaphragm from both sides by the use of two grids instead of the only condenser-plate.

The invention is represented in the accompanying drawing.

Figure 1:
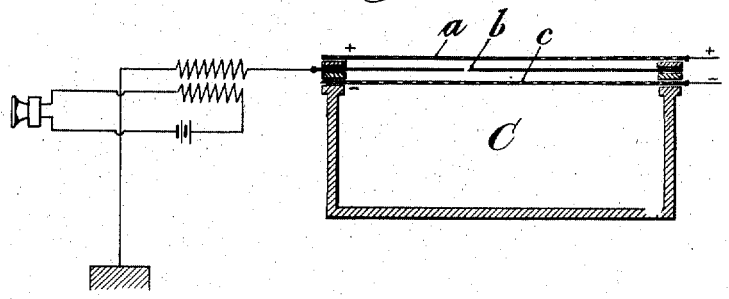
Figure 2:
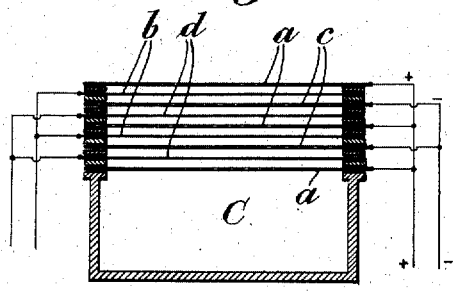

Figure 1 shows a simple condenser-telephone with the scheme of the electric connection according to the invention, Fig. 2 is a combined condenser-telephone.

Between two differently charged grids, *a* and *c* a diaphragm *b* is arranged, which must not be necessarily elastic, (foil or conducting tissue, for instance) and which is caused to vibrate by means of the microphone-transformer. To increase the vigor of sounds a sufficient space of air C may be provided.

The mode of action of this condenser-telephone is as follows: The wave-current produces alternating charges which cause the diaphragm to be attracted by the one grid and repulsed by the other. In this way the diaphragm is caused to vibrate and the vibrations are transmitted through the grids into the air. The efficacy of the telephone remains the same if the diaphragm is charged and the grids are influenced by the transformer. In the same manner di-electric grids with a conducting diaphragm, or a dielectric diaphragm with conducting grids can be used for the production of sounds, if the dielectric is charged for instance by rubbing.

The insulation of grids and diaphragm can be attained in three ways: 1, by insulating spaces; 2, by insulating the grids; 3, by insulating the diaphragm. Another possibility of connecting consists in charging the grid *a* and the diaphragm *b* in one sense and the grid *c* in the other sense, both systems being influenced by the microphone-transformer. In this case it is not necessary to insulate grid *a* against diaphragm *b*.

An increased reproduction of sounds can be attained by combining several condenser-telephones to a multiple condenser-telephone or telephone-battery, as shown in Fig. 2. In this case all the grids *a* are charged in one sense, all the grids *c* in the other sense. The diaphragms *b* are connected with one end of the secondary winding of the transformer, the diaphragms *d* with the other end of it. Again a sufficient space of air C may be added.

The increased efficacy of the battery is due to the circumstance, that at any phase of the undulatory current, the diaphragms *b* as well as the diaphragms *d* vibrate in the same direction, thus acting so upon each other that a larger amplitude and therefore a higher effect is attained.

What I claim is:

1. A telephone of the character specified for directly translating modulated electric currents into audible sound, embodying therein an imperforate diaphragm, and a perforated electrically charged condenser member operatively associated therewith, substantially as described.

2. A telephone of the character specified for directly translating modulated electric currents into audible sound, embodying therein an imperforate diaphragm, and a perforated electrically charged condenser member at each side thereof, substantially as described.

3. A telephone of the character specified, embodying therein a pair of spaced, oppositely electrically charged, perforated condenser members, and a diaphragm arranged between said members, substantially as described.

4. A telephone of the character specified, embodying therein a plurality of parallel diaphragms, a positively electrically charged perforated condenser member at one side of each diaphragm, and a negatively charged perforated condenser member at the opposite side of each diaphragm, substantially as described.

5. A telephone of the character specified, embodying therein a casing provided with an air space, a diaphragm carried by said casing, a microphone transformer connected with said diaphragm, and a perforated condenser member operatively associated with said diaphragm, substantially as described.

6. A telephone of the character specified, embodying therein a casing provided with an air space, a diaphragm carried by said casing, a microphone transformer connected with said diaphragm, and a perforated condenser member at each side of said diaphragm, said condenser members being oppositely charged electrically.

7. In a condenser telephone for directly translating modulated electric currents into audible sound, an imperforate diaphragm area comprising conducting tissue, and a perforated electrically charged condenser member operatively associated therewith.

8. In a condenser telephone, an imperforate diaphragm area comprising conducting tissue, and a perforated electrically charged condenser member operatively associated therewith, said diaphragm extending along one surface of said condenser member with a stratum of air and other insulating means between the diaphragm and condenser member.

9. In a condenser telephone, imperforate diaphragm means comprising areas of conductive foil, perforated electrically charged grid condenser means, said diaphragm means and condenser means being operatively associated and relatively closely spaced by air pockets and insulating means, the perforations of the condenser means being effective to lessen the dampening action of the air pockets.

10. A telephone of the character specified for directly translating modulated electric currents into audible sound, embodying therein an imperforate diaphragm, and an electrically charged condenser member operatively associated therewith, said member having numerous relatively small perforations distributed over its area.

11. In a condenser telephone, an imperforate diaphragm area comprising conducting foil, and an electrically charged condenser member operatively associated therewith, and extending closely adjacent to one surface of the diaphragm but separated therefrom by air and other insulating means, said member having perforations distributed over its area, said perforations being communicative with the air between diaphragm and condenser member.

12. A telephone of the character specified, embodying an imperforate diaphragm of conductive foil supported along and relatively closely adjacent to a surface area of an electrically charged condenser member and insulated therefrom by means including air, said member having numerous perforations distributed over its area and communicative with the air between said diaphragm and said member.

13. A condenser telephone, embodying supporting means having an air cavity at one side of which a plurality of operatively associated condenser members are mounted face to face, one of said members comprising an imperforate diaphragm, another of said members comprising a perforated electrically charged condenser member, the perforations of which communicate with the air of said cavity and with air space between said members.

14. A telephone of the character specified for directly translating modulated electric currents into audible sound, embodying therein an imperforate diaphragm, and an electrically charged condenser member operatively associated therewith, said member having numerous perforations distributed over substantially its entire effective area which directly cooperates with the diaphragm.

15. A condenser telephone embodying an imperforate diaphragm of insulated conductive foil supported along a surface area of an electrically charged condenser member, said member having numerous closely adjacent perforations distributed over its area to provide a grid construction.

16. A condenser telephone embodying an imperforate diaphragm of conductive foil supported between and relatively closely adjacent to surface areas of a pair of electrically charged condenser members, said members having numerous closely adjacent perforations distributed over their areas to provide grid constructions.

17. A condenser telephone embodying an imperforate diaphragm of insulated conductive foil extending along a surface area of an electrically charged condenser member, said member having numerous closely adjacent perforations distributed over substantially its entire area as opposed in cooperative relationship with the diaphragm.

18. A condenser telephone embodying an imperforate diaphragm of conductive foil supported between and relatively closely adjacent to surface areas of a pair of electrically charged condenser members, said members having numerous closely adjacent perforations distributed over substantially their entire areas as opposed in cooperative relationship with the diaphragm.

19. A condenser telephone embodying an imperforate diaphragm of foil supported along a surface area of an electrically charged condenser member, said member having numerous closely adjacent perforations substantially uniformly distributed over its area to provide a grid construction.

20. A condenser telephone embodying an imperforate electrically charged diaphragm, and another electrically charged condenser member operatively associated therewith, said last named member having numerous closely adjacent perforations distributed over substantially its entire area as opposed in cooperative relationship with vibratory portions of said diaphragm, said perforations in area amounting to a substantial proportion of the total area of the member.

21. A condenser telephone embodying an imperforate electrically charged diaphragm, and another electrically charged condenser member operatively associated therewith, said last named member having numerous closely adjacent perforations distributed over its area as opposed in cooperative relationship with vibratory portions of said diaphragm, said perforations each being quite small as compared to the total area of said member but in the aggregate amounting to a substantial proportion of the total area of the member.

22. A condenser telephone embodying an imperforate electrically charged diaphragm, and another electrically charged condenser member operatively associated therewith, said last named member having numerous closely adjacent perforations distributed over its area as opposed in cooperative relationship with vibratory portions of said diaphragm, said perforations being spaced at distances in the neighborhood of the widths of the perforations.

In testimony whereof, I have signed my name to this specification.

JOSEF UNTERHOLZNER.